United States Patent
Lister et al.

(10) Patent No.: US 11,421,585 B2
(45) Date of Patent: Aug. 23, 2022

(54) VARIABLE SPEED DRIVE FOR AN ACCESSORY DRIVE IN A HYBRID POWER SYSTEM

(71) Applicant: Caterpillar Inc., Deerfield, IL (US)

(72) Inventors: Brian Lister, Edwards, IL (US); Gaurav Vasudeva, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 567 days.

(21) Appl. No.: 16/505,396

(22) Filed: Jul. 8, 2019

(65) Prior Publication Data

US 2021/0010415 A1  Jan. 14, 2021

(51) Int. Cl.
| | |
|---|---|
| F02B 67/06 | (2006.01) |
| F16H 1/28 | (2006.01) |
| F16F 15/30 | (2006.01) |
| F16H 1/20 | (2006.01) |
| F16H 9/16 | (2006.01) |
| F16H 37/02 | (2006.01) |

(52) U.S. Cl.
CPC ............ *F02B 67/06* (2013.01); *F16F 15/30* (2013.01); *F16H 1/20* (2013.01); *F16H 1/28* (2013.01); *F16H 9/16* (2013.01); *F16H 37/022* (2013.01)

(58) Field of Classification Search
CPC .. F02B 67/06; F16F 15/30; F16H 1/20; F16H 1/28; F16H 9/16; F16H 9/24; F16H 9/125; F16H 55/52; F16H 37/022; F16H 37/021
See application file for complete search history.

(56) References Cited

U.S. PATENT DOCUMENTS

| | | | | |
|---|---|---|---|---|
| 3,672,244 A | * | 6/1972 | Nasvytis | B60K 6/105 |
| | | | | 477/110 |
| 4,304,150 A | * | 12/1981 | Lupo | F16H 37/021 |
| | | | | 74/731.1 |
| 4,588,040 A | | 5/1986 | Albright, Jr. et al. | |
| 4,625,823 A | | 12/1986 | Frank | |
| 5,792,013 A | * | 8/1998 | Heinrich | F16G 5/18 |
| | | | | 474/8 |

(Continued)

FOREIGN PATENT DOCUMENTS

| | | | | |
|---|---|---|---|---|
| GB | 2463502 A | | 3/2010 | |
| JP | 2015-190536 | * | 2/2015 | ............. F16H 37/02 |

(Continued)

OTHER PUBLICATIONS

EPO Machine Translation of WO 2013175587 A1 Description and Claims, Nakada, Nov. 28, 2013 (Year: 2013).*

(Continued)

*Primary Examiner* — Vinh Luong
(74) *Attorney, Agent, or Firm* — Harrity & Harrity LLP (57) ABSTRACT

A variable drive system, to drive an accessory drive of a machine may include a first variable pulley to be mechanically coupled to the accessory drive and an engine output of an engine. The variable drive system may also include a second variable pulley to be mechanically coupled to a flywheel. The variable drive system may include a drive element to rotate, according to a clutch system, about the first variable pulley and the second variable pulley to at least one of: drive the second variable pulley to charge the flywheel with kinetic energy or drive the first variable pulley via kinetic energy from the flywheel.

20 Claims, 5 Drawing Sheets

(56) References Cited

U.S. PATENT DOCUMENTS

| | | |
|---|---|---|
| 6,503,166 B1 | 1/2003 | Van Druten et al. |
| 8,601,895 B2 | 12/2013 | Serkh et al. |
| 8,708,081 B1 | 4/2014 | Williams |
| 9,102,223 B2 | 8/2015 | Greenwood |
| 9,108,625 B2 | 8/2015 | Tanaka et al. |
| 9,950,604 B2 | 4/2018 | Wesolowski et al. |
| 2010/0280712 A1 | 11/2010 | Bowman |
| 2011/0053720 A1* | 3/2011 | Kang .................... F16H 37/021 474/148 |
| 2014/0045651 A1* | 2/2014 | Jacobson .............. B60W 10/24 477/70 |
| 2017/0009863 A1* | 1/2017 | Holmes ................. F16H 37/021 |
| 2017/0174066 A1* | 6/2017 | Wesolowski .......... B60W 20/00 |
| 2018/0112738 A1* | 4/2018 | Bruestle ................ A01B 51/026 |
| 2018/0163827 A1* | 6/2018 | Kaji ........................ F16H 9/125 |
| 2018/0252315 A1* | 9/2018 | Rippelmeyer .... F16H 61/66272 |
| 2020/0398653 A1* | 12/2020 | Walter ................... B60K 6/442 |

FOREIGN PATENT DOCUMENTS

| | | | |
|---|---|---|---|
| WO | 2004000595 | 12/2003 | |
| WO | WO 2013175587 A1 * | 11/2013 | ............. F16H 37/02 |

OTHER PUBLICATIONS

Define kinetic energy, Google Search, Feb. 6, 2022 (Year: 2022).*
Kinetic energy, Wikipedia, Dec. 6, 2021 (Year: 2021).*

* cited by examiner

VARIABLE SPEED DRIVE FOR AN ACCESSORY DRIVE IN A HYBRID POWER SYSTEM

TECHNICAL FIELD

The present disclosure relates generally to a power system and, for example, to a power system with an engine and a flywheel.

BACKGROUND

An accessory drive (e.g., a front end accessory drive (FEAD)) of a machine (e.g., a vehicle, construction equipment, and/or the like) is used to transfer power to one or more accessories (e.g., a fan, an air-conditioner unit, an alternator, and/or the like) of a machine. Generally, the accessory drive receives power from an engine (e.g., an internal combustion engine) of a power system of the machine. In some instances, the accessory drive can receive power from a flywheel of a power system that includes a kinetic energy recovery system. The flywheel can be charged with kinetic energy from an engine output (e.g., a crankshaft) of an engine.

One approach to power accessories is disclosed in U.S. Pat. No. 8,601,895 that issued to Serkh et al. on Dec. 10, 2013 ("the '895 patent"). In particular, the '895 patent discloses a kinetic energy storage device, a driver having a driver output, a transmission having a gear ratio connected to the driver output, a belt driven accessory system connected to the transmission through a first clutch, the kinetic storage device connected to the belt driven accessory system through a second clutch, and the kinetic energy storage device and the transmission connectable through the first clutch and second clutch.

While the transmission of the '895 patent may drive a belt driven accessory system, the accessories are driven through a constant speed ratio of the transmission.

The variable drive system of the present disclosure solves one or more of the problems in the art.

SUMMARY

According to some implementations, a variable drive system to drive an accessory drive of a machine may include a first variable pulley to be mechanically coupled to the accessory drive and an engine output of an engine; a second variable pulley to be mechanically coupled to a flywheel; and a drive element to rotate, according to a clutch system, about the first variable pulley and the second variable pulley to at least one of: drive the second variable pulley to charge the flywheel with kinetic energy, or drive the first variable pulley via kinetic energy from the flywheel.

According to some implementations, a power system to drive an accessory drive of a machine may include an engine configured to provide power via an engine output; a flywheel configured to store kinetic energy; a clutch system configured to at least one of: enable, via a first clutch, a transfer of power from the engine output, or enable, via a second clutch, a transfer of power associated with the flywheel; and a variable drive configured to drive the accessory drive using power from at least one of the engine or the flywheel according to a setting of the clutch system.

According to some implementations, a method is performed by a variable drive to transfer power from a power system to an accessory drive of a machine, the method comprising: setting, based on an operating mode of the machine, a first engagement radius of a first variable pulley of the variable drive; setting, based on the operating mode, a second engagement radius of a second variable pulley of the variable drive; and causing, based on the operating mode, a clutch system to engage at least one of: an engine drive clutch of an engine of the power system, or a flywheel drive clutch of a flywheel of the power system.

DETAILED DESCRIPTION

Figure 1:
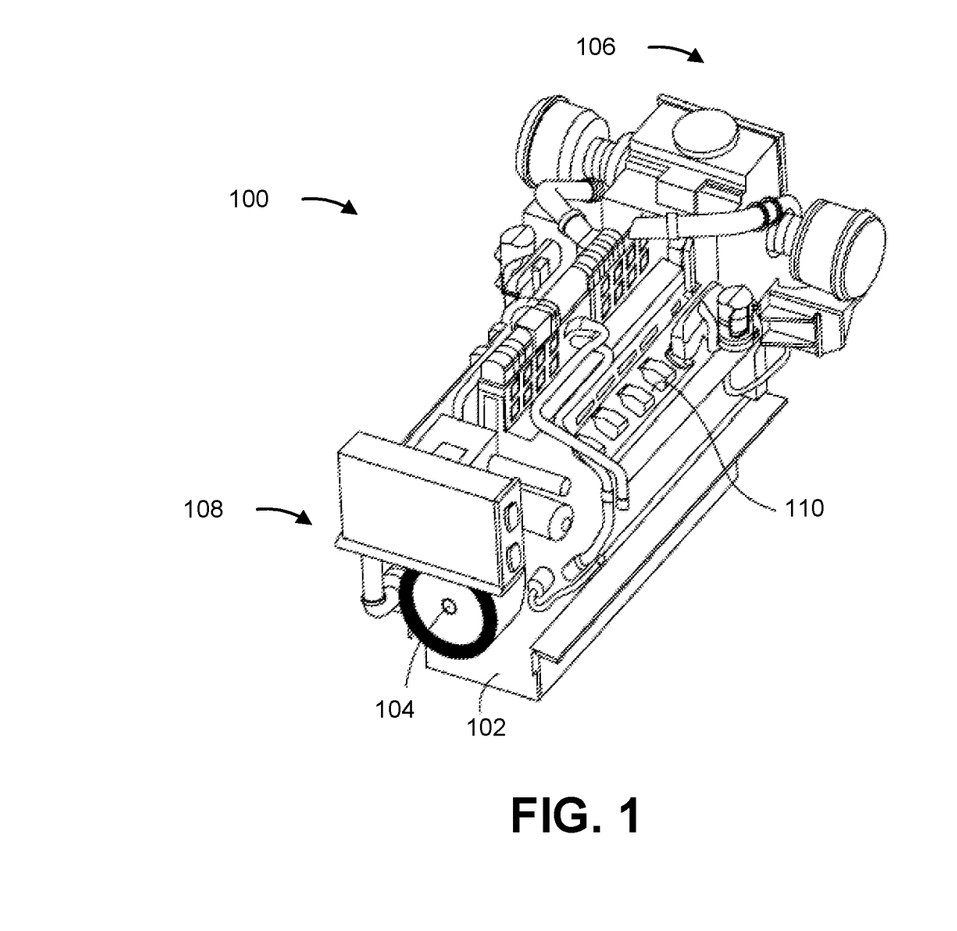
FIG. 1 is a diagram of an example implementation of an engine as described herein.

FIG. 1 is a diagram of an example implementation of an engine 100 described herein. Engine 100 may be an internal combustion engine powered by any fuel, such as natural gas, diesel, gasoline, and/or a combination thereof. Engine 100 may be employed by a machine (e.g., a vehicle, power generation equipment, transportation equipment, construction equipment, agriculture equipment, forestry equipment, aviation equipment, marine equipment, mining equipment, material handling equipment, waste management equipment, and/or the like).

Engine 100 may include an engine block 102. Engine block 102 may include one or more cylinders (not shown) provided therein. The cylinders may be arranged in any configuration, such as inline, radial, "V", and so on. Engine 100 further may include a piston (not shown) movably disposed within each of the cylinders. Each of the pistons may be coupled to an engine output 104 (e.g., a crankshaft) of engine 100. Energy generated from combustion of the fuel inside the cylinders may be converted to rotational energy of engine output 104 by the pistons. Engine output 104 may extend from engine 100 toward a front end 106 of engine 100 and/or from engine 100 toward a backend 108 of engine 100. As described herein, an accessory drive may be positioned toward front end 106, and a machine drive (e.g., a transmission to control a machine speed of a machine of engine 100) may be positioned toward backend 108.

Engine 100 may include a cylinder head 110 mounted on the engine block 102. Cylinder head 110 may house one or more components and/or systems (not shown) of engine 100 such as a valve train, an intake manifold, an exhaust manifold, sensors, and so on. Engine 100 may include various other components and/or systems (not shown) such as a crankcase, a fuel system, an air system, a cooling system, a turbocharger, an exhaust gas recirculation system, an exhaust gas aftertreatment system, other peripherals, and so on.

As indicated above, FIG. 1 is provided as an example. Other examples may differ from what is described in connection with FIG. 1.

Figure 2:
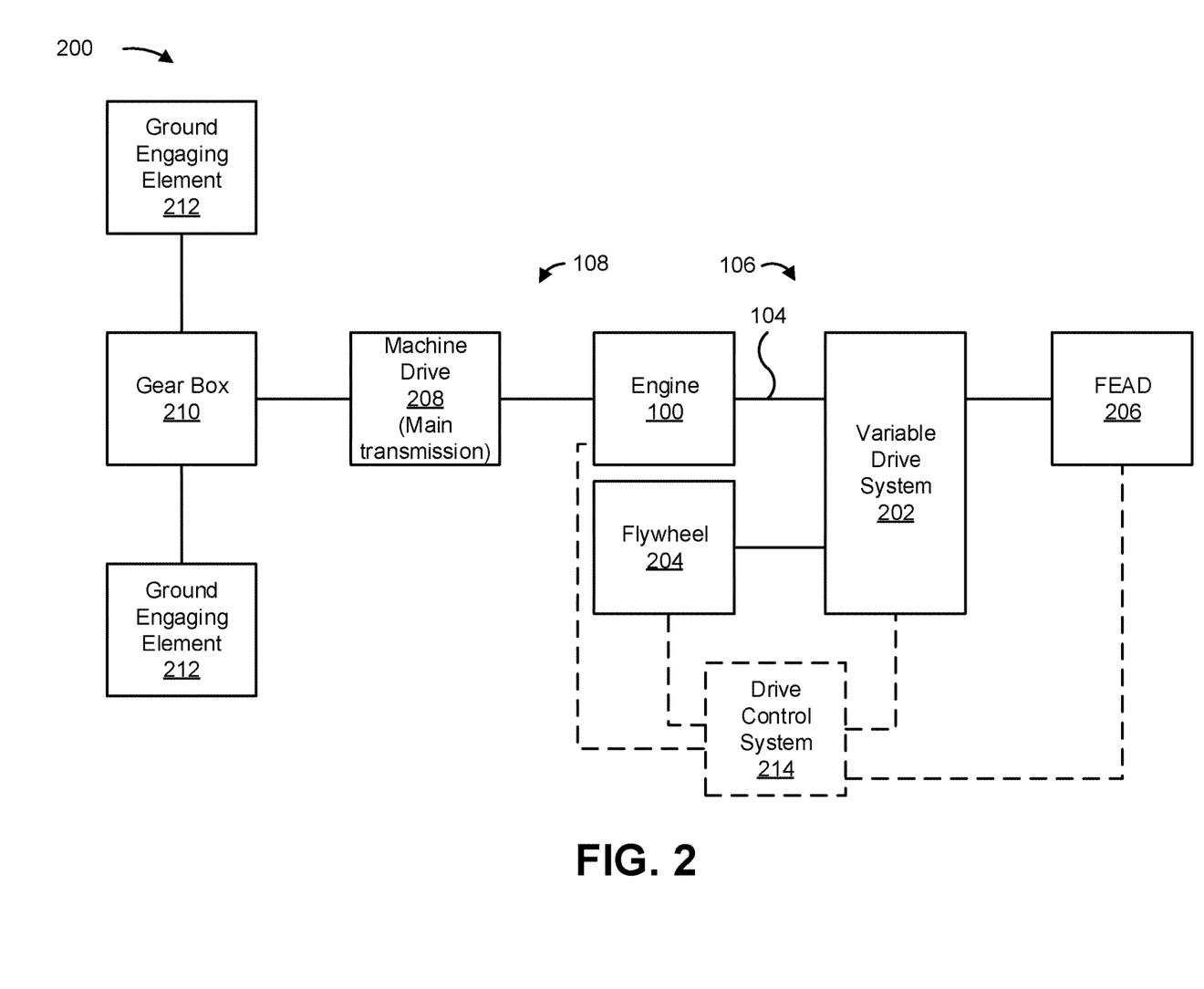
FIG. 2 is a diagram of an example implementation of a power system described herein.

FIG. 2 is a diagram of an example implementation of a power system 200 described herein. Power system 200 of FIG. 2 includes an engine 100 (which may correspond to engine 100 of FIG. 1), a variable drive system 202, a flywheel 204, a front engine accessory drive (FEAD) 206, a machine drive 208, a gear box 210, and one or more ground engaging elements 212 (referred to individually as a "ground engaging element 212" and collectively as "ground engaging elements 212"). Engine 100, variable drive system 202, flywheel 204, FEAD 206, machine drive 208, gear box 210, and ground engaging elements 212 may be mechanically coupled to each other (as shown by respective solid lines). Drive control system 214 may be mechanically, electrically, and/or hydraulically connected to engine 100, variable drive system 202, flywheel 204, and/or FEAD 206 (as shown by respective dashed lines). As used herein, components are "mechanically coupled" when the components are attached to (e.g., fastened to via one or more fasteners or couplings, fit to, adhered to, and/or the like) each other directly (without any intervening components other than fasteners or couplings) or attached to each other via one or more intervening parts. Further, as used herein, components are "mechanically connected" when the components are attached to each other without any intervening components (other than fasteners or couplings).

Power system 200 may be included within and/or associated with a machine that is movable via ground engaging elements 212. As described herein, variable drive system 202 may control a transfer of power from engine 100 to FEAD 206 and/or to flywheel 204. Additionally, or alternatively, variable drive system 202 may control a transfer of power from flywheel 204 to engine 100 (e.g., to start engine 100) and/or FEAD 206 (e.g., to power accessories of FEAD 206).

As described herein, variable drive system 202 may include a variable drive. While some examples described herein may refer to such as a variable drive as being a continuously variable transmission (CVT), the variable drive of variable drive system 202 may include a mechanical adjustable speed drive, a hydraulic adjustable speed drive, a hydraulic parallel path variable transmission, a hydrostatic drive, an electrical drive, and/or type of variable drive. The variable drive may include a first variable pulley (e.g., a primary drive of a CVT), a second variable pulley (e.g., a secondary drive of a CVT), and a drive element (e.g., a belt, a cable, a chain, and/or the like) coupled to the first variable pulley and the second variable pulley. As used herein, the first variable pulley may be referred to as an "engine output pulley" and the second variable pulley may be referred to as a "flywheel drive pulley." As described herein, variable drive system 202 may include one or more clutches to enable transfer of power of power system 200. Additionally, or alternatively, variable drive system 202 may include one or more fixed gear ratio drives.

Flywheel 204 may be a flywheel of a kinetic energy recovery system (KERS). Flywheel 204 may be charged with kinetic energy (e.g., by accelerating and/or increasing a rotational speed of flywheel 204 via a transfer of power from engine output 104 via variable drive system 202. Additionally, or alternatively, flywheel 204 may be discharged (e.g., by reducing a speed of flywheel 204 and/or applying a load to a flywheel drive of flywheel 204) via a transfer of power to engine output 104 and/or to FEAD 206.

FEAD 206 may include one or more drives and/or a drive element (e.g., a belt, such as a serpentine belt) coupled and/or fit to the one or more drives. FEAD 206 may be configured to receive (e.g., via a driveshaft) power from engine 100 (e.g., via engine output 104) and/or power from flywheel 204. FEAD 206 may transfer the received power to one or more accessories (e.g., a fan, an air-conditioning unit, an alternator, and/or the like) of the machine.

Machine drive 208 includes one or more mechanical elements (e.g., gears, torque converter, and/or the like) configured to adjust a rotational power output from engine 100. Engine 100 may be coupled to a driveshaft (e.g., which may be a same shaft as engine output 104). Machine drive 208 may include a powershift transmission with discrete gear ratios (e.g., at least two discrete gear ratios). Additionally, or alternatively, machine drive 208 may include a CVT. In some implementations, machine drive 208 may include an automatic transmission that can be controlled by a controller (e.g., drive control system 214) based on one or more characteristics of machine drive 208 and/or the machine (e.g., engine speed, engine load, engine torque output, and/or the like). For example, machine drive 208 may receive a gear command from drive control system 214, that may be used to shift gears of machine drive 208. In some implementations, an engine output speed of engine output 104 may correspond to an input speed of machine drive 208 (e.g., a torque converter input speed (TCIS) (if machine drive 208 includes a torque converter), a transmission input speed (TIS), and/or the like).

Gear box 210 includes one or more mechanical elements (e.g., gears, a differential, and/or the like) configured to provide power to ground engaging elements 212. In some implementations, gear box 210 may provide steering by differentially driving a first ground engaging element 212 and a second ground engaging element 212 (e.g., according to a steering input from an operator of the machine, according to instructions from an automated steering control device, and/or the like). Accordingly, gear box 210 may mechanically transfer an appropriate amount of power to drive ground engaging elements 212 to move and/or steer the vehicle. Ground engaging element 212 may include one or more devices (e.g., wheels, tires, tracks, and/or the like) that use rotational power to move the machine.

Drive control system 214 includes one or more devices (e.g., electrical components, hydraulic components, and/or the like) or systems (e.g., electrical systems, hydraulic systems, and/or the like) for receiving information (e.g., speed information, position information, settings, and/or the like) from one or more components of power system 200 and/or controlling one or more components of power system 200. For example, as shown by the dashed lines, drive control system 214 may utilize electrical signals and/or hydraulics to communicate with and/or control engine 100, variable drive system 202, flywheel 204, and/or machine drive 208.

Electrical components of drive control system 214 are implemented in hardware, firmware, or a combination of hardware and software. For example, one or more electrical components of drive control system 214 are implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Drive control system 214 may include one or more processors capable of being programmed to perform a function. In some implementations, one or more memories associated with drive control system 214, including a an electrically erasable programmable read-only memory (EEPROM)), a random access memory (RAM), a read only memory (ROM), and/or another type of dynamic or static storage device (e.g., a flash memory, a magnetic memory, optical memory, and/or the like) may store information and/or instructions for use by drive control system 214.

Drive control system 214 may be configured with mapping information associated with controlling one or more components of power system 200, such as variable drive system 202. Drive control system 214 may store the mapping information in the one or more memories. The mapping information may include information associated with statuses of components of power system 200 and corresponding operating modes of the machine, processes, and/or actions that are to be performed by variable drive system 202 (e.g., adjustments to a gear ratio of a variable drive of variable drive system 202, adjustments to one or more clutches of variable drive system 202, and/or the like). In some implementations, drive control system 214 may be configured with the mapping information during a manufacturing process, a calibration process associated with variable drive system 202, a setup process associated with variable drive system 202, and/or the like.

Drive control system 214 may receive one or more inputs (e.g., electrical inputs, hydraulic inputs, mechanical inputs and/or the like) from one or more components of power system 200, from one or more sensors associated with the components of power system 200, from one or more operator control devices associated with power system 200 (e.g., an electronic user interface of an operator station of the machine, a mechanical implement of the operator station, and/or the like) and/or the like. Further, drive control system 214 may provide an output to variable drive system 202 (and/or one or more other components of power system 200) based on the one or more inputs. For example, drive control system 214 may be configured to determine an operating mode of the machine (which may correspond to an operating mode of power system 200), based on one or more inputs providing information associated with the components of power system 200. As described herein, such operating modes may include a startup mode (e.g., based on being engine 100 being started), a launch FEAD mode (e.g., based on an input to power one or more accessories of FEAD 206), a drive FEAD with engine mode (e.g., based on an engine output speed of engine output 104 and/or flywheel speed of flywheel 204), a launch flywheel mode (e.g., based on an input indicating that a KERS is to be activated, indicating the rotational speed of flywheel 204 being zero revolutions per minute (RPM), and/or the like), a charge flywheel mode (e.g., based on an input indicating that flywheel 204 is to store kinetic energy, an input indicating a rotational speed of flywheel 204, and/or the like), a discharge flywheel mode (e.g., based on an input indicating that power is to be transferred from flywheel 204, an input indicating that flywheel 204 is to be stopped, an input indicating a rotation speed of flywheel 204, and/or the like), a drive FEAD with flywheel mode (e.g., based on an input indicating that engine 100 is shut down, an input indicating that FEAD 206 is to receive power from flywheel 204, an input indicating that FEAD 206 is to receive a power boost, an input indicating that fuel consumption by engine 100 is to be reduced, and/or the like), an engine restart mode (e.g., based on an input indicating engine 100 is to be restarted using power from flywheel 204, based on an input indicating the rotational speed of flywheel 204, and/or the like). In this way, drive control system 214 may determine an operating mode of the machine and/or a corresponding action or process that is to be performed by variable drive system 202 based on the operating mode.

As indicated above, FIG. 2 is provided as an example. Other examples may differ from what is described in connection with FIG. 2.

Figure 3:
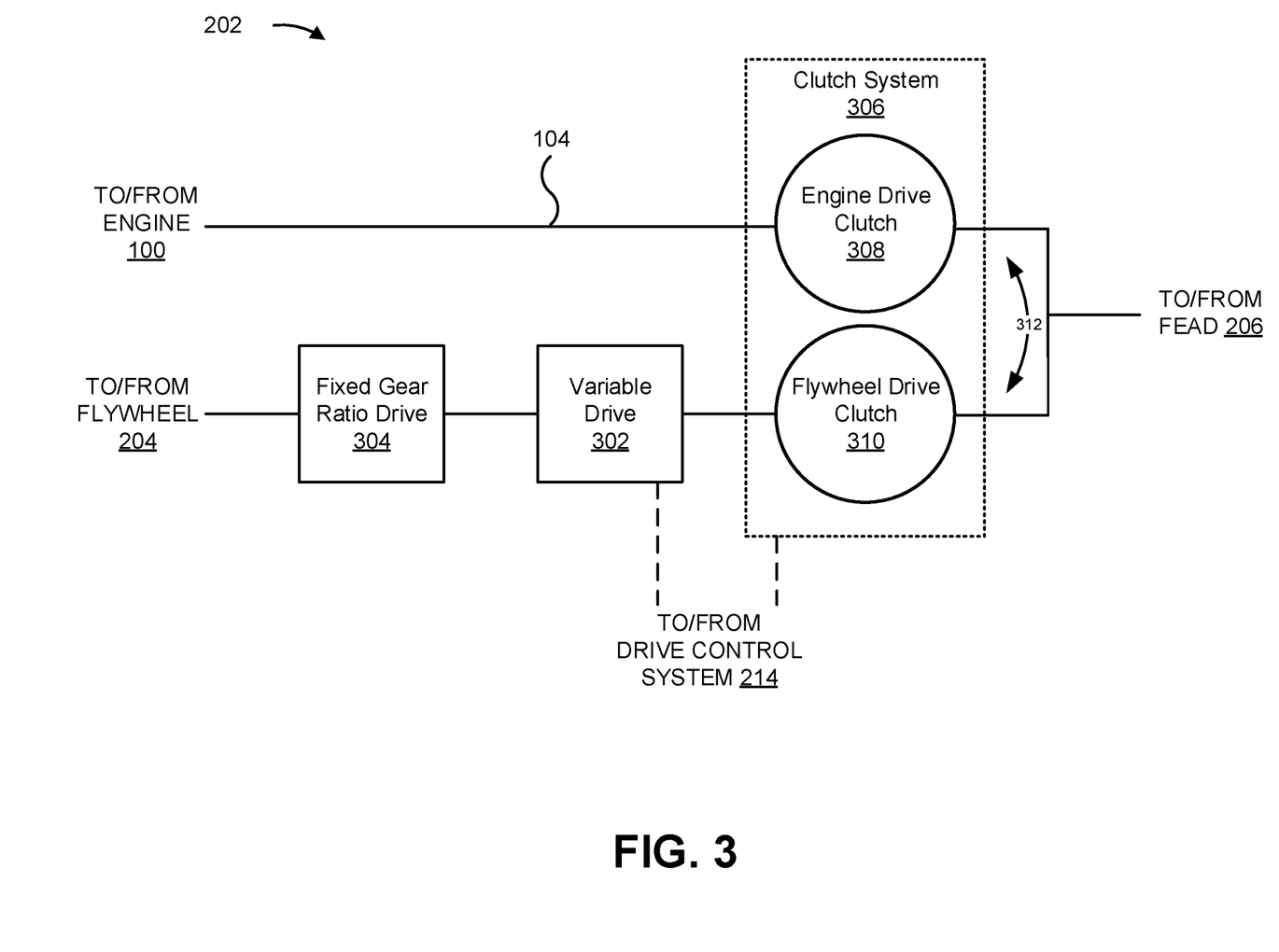
FIG. 3 is a diagram of an example implementation of a variable drive system of the example power system of FIG. 2.

FIG. 3 is a diagram of an example implementation of variable drive system 202 of power system 200 of FIG. 2. In the example implementation of FIG. 3, variable drive system 202 includes a variable drive 302, a fixed gear ratio drive 304, and a clutch system 306 with an engine drive clutch 308 and a flywheel drive clutch 310.

As shown in FIG. 3, variable drive 302 is positioned between clutch system 306 (e.g., between flywheel drive clutch 310) and flywheel 204, and clutch system 306 is positioned between engine 100 and variable drive 302. Furthermore, FEAD 206 is positioned between engine drive clutch 308 and flywheel drive clutch 310 of clutch system 306. Engine drive clutch 308 and/or flywheel drive clutch 310 may be implemented by any suitable clutch. For example, engine drive clutch 308 and/or flywheel drive clutch 310 may be a friction-based clutch that is engaged by applying a pressure between clutch plates of the clutch. In such a case, a first plate of engine drive clutch 308 may be mechanically connected to engine output 104, and a second clutch plate of engine drive clutch may be mechanically connected to a driveshaft of FEAD 206. Further, a first plate of flywheel drive clutch 310 may be mechanically connected to the driveshaft of FEAD 206, and a second clutch plate of flywheel drive clutch 310 may be mechanically connected to a variable pulley (e.g., a primary pulley) of variable drive 302.

Engagement of engine drive clutch 308 and/or engagement of flywheel drive clutch 310 determines a direction of power transfer through variable drive system 202. As described herein, when a clutch is "engaged," the clutch may be "partially engaged" to allow the clutch to slip or "fully engaged," which does not allow the clutch to slip. A clutch may slip when an amount of pressure applied between clutch plates of the clutch does not provide enough friction (which may depend on the coefficient of friction of the clutch plates) to cause the clutch plates of the clutch to co-rotate or have a same rotational speed. As described herein, FEAD 206 may receive power when engine drive clutch 308 and/or flywheel drive clutch 310 are engaged (and engine 100 is running and/or flywheel 204 has a threshold rotational speed (has a threshold level of kinetic energy stored). Clutch system 306 may enable bidirectional power transfer 312 through engine drive clutch 308 and flywheel drive clutch 310. For example, when both engine drive clutch 308 and flywheel drive clutch 310 are engaged, power may be transferred from engine 100 to flywheel 204 (e.g., to charge flywheel 204) or power may be transferred from flywheel 204 to engine 100 (e.g., to start engine 100).

As described herein, variable drive 302 may include a first variable pulley, a second variable pulley, and a drive element mechanically connected to the first variable pulley and the second variable pulley. The first variable pulley may be mechanically coupled to flywheel drive clutch 310 (e.g., a clutch plate of flywheel drive clutch 310 that is different from the clutch plate of flywheel drive clutch 310 that is connected to the driveshaft of FEAD 206), and the second variable pulley may be mechanically coupled to flywheel 204. As shown in the example of FIG. 3, variable drive system 202 may include a fixed gear ratio drive 304 mechanically coupled between variable drive 302 and flywheel 204. Fixed gear ratio drive 304 may include one or more gear trains. For example, fixed gear ratio drive 304 may include one or more countershaft gear trains and/or one or more planetary gear trains. In some implementations, the fixed gear ratio drive 304 may be mechanically coupled between variable drive 302 and flywheel drive clutch 310, and variable drive 302 may be mechanically connected to flywheel 204. Additionally, or alternatively, one or more additional fixed gear ratio drives may be mechanically coupled between flywheel drive clutch 310 and flywheel 204.

As indicated above, FIG. 3 is provided as an example. Other examples may differ from what is described in connection with FIG. 3.

Figure 4:
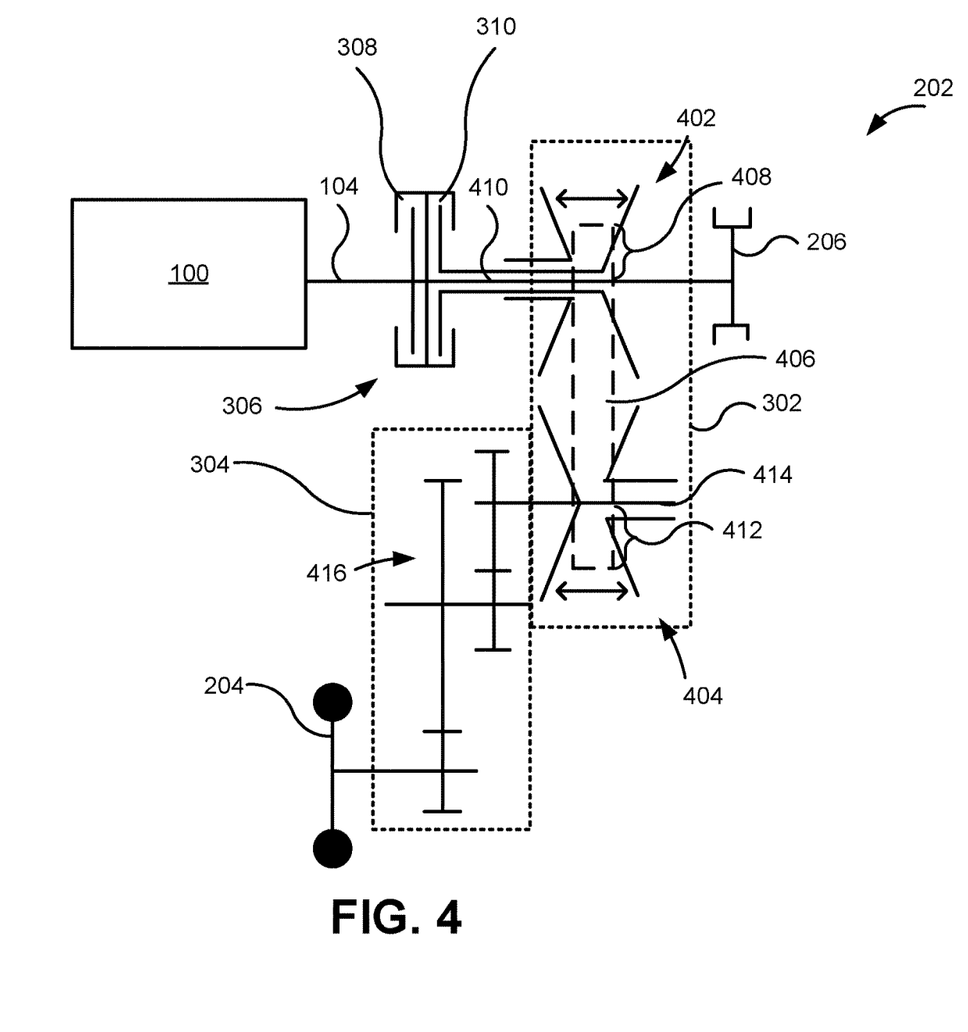
FIG. 4 is a diagram of an example implementation of a configuration of a variable drive of the example variable drive system of FIG. 3.

FIG. 4 is a diagram of an example implementation of a configuration of a variable drive 302 of variable drive system 202 of FIG. 3. In the example implementation of FIG. 4, variable drive 302 includes a first variable pulley 402, a second variable pulley 404, and a drive element 406. Variable drive 302 may be a CVT. In some implementations, first variable pulley 402 may be considered a primary pulley and second variable pulley 404 may be considered a secondary pulley of the CVT when transferring power from engine 100 (e.g., via engine output 104) through to flywheel 204 (e.g., because the direction of the transfer of power is from first variable pulley 402 to second variable pulley 404). Additionally, or alternatively, second variable pulley 404 may be considered a primary pulley and first variable pulley 402 may be considered a secondary pulley of the CVT when transferring power from flywheel 204 through to engine 100 (e.g., because the direction of the transfer of power is from second variable pulley 404 to first variable pulley 402).

Each of first variable pulley 402 and second variable pulley 404 are variable in an engagement radius of first variable pulley and/or second variable pulley 404 can be adjusted. The engagement radius may correspond to the distance between a driveshaft of the pulley and a point of contact of a drive element with the pulley. For example, in the example of FIG. 4, first variable pulley 402 has an engagement radius 408 relative to a driveshaft 410 of FEAD 206, and second variable pulley has an engagement radius 412 relative to a pulley driveshaft 414 of second variable pulley 404.

As shown in FIG. 4, driveshaft 410 may be mechanically coupled to engine output via engine drive clutch 308. In some implementations, engine drive clutch 308 (and/or clutch system 306) is the only component between driveshaft 410 and engine output 104. As further shown in the example of FIG. 4, first variable pulley 402 is mechanically coupled to flywheel drive clutch 310. In some implementations, flywheel drive clutch 310 may be the only component between first variable pulley 402 and engine output 104.

In the example of FIG. 4, fixed gear ratio drive 304 includes fixed ratio gear trains 416. Fixed ratio gear trains 416 may include a single pair of countershaft gear trains (e.g., a single gear ratio) or multiple engageable pairs of countershaft gear trains (e.g., for multiple possible gear ratios). Additionally, or alternatively, fixed ratio gear trains 416 may be implemented by and/or may include one or more planetary gear trains (e.g., of a planetary transmission).

As indicated above, FIG. 4 is provided as an example. Other examples may differ from what is described in connection with FIG. 4.

Figure 5:
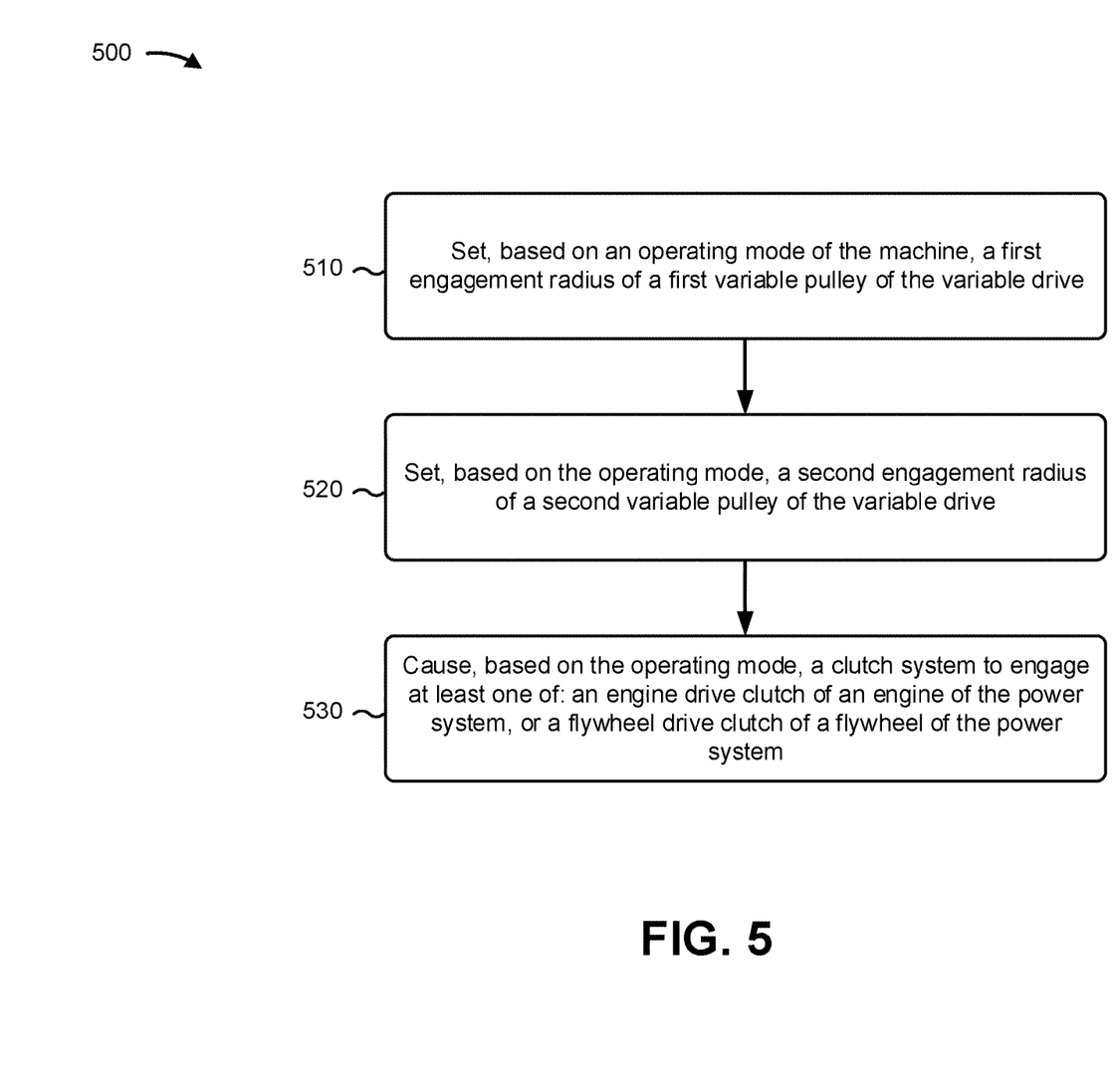
FIG. 5 is a flowchart of an example process associated with a variable speed drive for an accessory drive in a hybrid power system.

FIG. 5 is a flowchart of an example process associated with a variable speed drive for an accessory drive in a hybrid power system. One or more process blocks of FIG. 5 may be performed by variable drive system 202. For example, one or more process blocks of FIG. 5 may be performed in association with transferring power from a power system (e.g., power system 200) to an accessory drive (e.g., FEAD 206) of a machine. Additionally, or alternatively, one or more process blocks of FIG. 5 may be performed by another device or a group of devices separate from or including variable drive system 202, such as drive control system 214, clutch system 306, and/or the like.

As shown in FIG. 5, process 500 may include setting, based on an operating mode of the machine, a first engagement radius of a first variable pulley of the variable drive (block 510) and setting, based on the operating mode, a second engagement radius of a second variable pulley of the variable drive (block 520). For example, variable drive system 202 may set the first engagement of first variable pulley 402 and the second engagement radius of second variable pulley 404 using one or more control devices (e.g., actuators, levers, valves, transducers, and/or the like). Variable drive system 202 may set the first engagement radius and the second engagement radius based on instructions from drive control system 214.

As further shown in FIG. 5, process 500 may include causing, based on the operating mode, a clutch system to engage at least one of: an engine drive clutch of an engine of the power system, or a flywheel drive clutch of a flywheel of the power system (block 530). For example, variable drive system 202 may cause clutch system 306 to engage (e.g., partially or fully) engine drive clutch 308 and/or flywheel drive clutch 310 to enable transfer of power to flywheel 204, FEAD 206, and/or engine 100.

As described herein, variable drive system 202 may be controlled to set engagement radii of first variable pulley 402 and/or second variable pulley 404 and/or cause clutch system 306 to engage engine drive clutch 308 and/or flywheel drive clutch 310 according to a particular operating mode of the machine and/or power system 200. In some implementations, the operating mode may be determined and/or indicated by drive control system 214.

In a startup mode (e.g., a mode associated with the machine and/or power system 200 being powered on and/or started), engine drive clutch 308 and/or flywheel drive clutch 310 may both be disengaged (e.g., to allow engine 100 to fully start and/or warm-up before having to provide power to a load (e.g., FEAD 206 and/or flywheel 204)). In a launch FEAD mode to start driving FEAD 206 and/or to enable power to be provided to accessories of the machine (e.g., after engine 100 is started and/or warmed-up), variable drive system 202 may cause clutch system 306 to engage and/or enable slip of engine drive clutch 308. In a drive FEAD with engine mode to enable transfer of power from engine 100 to FEAD 206, variable drive system 202 may cause clutch system 306 to fully engage engine drive clutch 308 and disengage (or leave disengaged) flywheel drive clutch 310.

In a launch flywheel mode to accelerate (e.g., from zero rotational speed) and/or start driving flywheel 204 to enable flywheel 204 to be charged with kinetic energy), variable drive system 202 may cause clutch system 306 to fully engage engine drive clutch 308 and engage and/or enable slip of flywheel drive clutch 310. Furthermore, in the launch flywheel mode, variable drive system 202 may set (and/or cause variable drive 302 to set) an engagement radius of first variable pulley 402 to be within a threshold range for launching a flywheel. In some implementations, in launch flywheel mode, the engagement radius of first variable pulley 402 and the engagement radius of second variable pulley 404 may satisfy (e.g., be smaller than or equal to) a threshold engagement radius for launching flywheel 204. According to some implementations, the engagement radii of first variable pulley 402 and/or second variable pulley 404 may be a smallest possible engagement radius of first variable pulley 402 and/or second variable pulley 404. Additionally, or alternatively, the engagement radii of first variable pulley 402 and second variable pulley 404 may be equal (e.g., within a threshold percentage).

In a charge flywheel mode to charge flywheel 204 with kinetic energy (e.g., by accelerating and/or rotating flywheel 204), variable drive system 202 may cause the clutch system to fully engage engine drive clutch 308 and flywheel drive clutch 310. Furthermore, in the charge flywheel mode, variable drive system 202 may set the engagement radius of first variable pulley 402 to be smaller than the engagement radius of second variable pulley 404. Accordingly, the gear ratio of first variable pulley 402 to second variable pulley 404 may be relatively low to provide greater torque output to flywheel 204. In some implementations, the engagement radii, in charge flywheel mode, may be set according to one or more inputs from drive control system 214 (e.g., inputs based on speed of engine output 104, speed of flywheel 204, and/or the like). In charge flywheel mode, the gear ratio of variable drive 302 may be variably decreased (e.g., decreased at a variable rate) to maintain an acceleration (e.g., a constant acceleration) of flywheel 204. In some implementations, in the charge flywheel mode, a maximum flywheel rotation speed may be achieved when the engagement radius of first variable pulley 402 is as small as possible and the engagement radius of second variable pulley 404 is as large as possible.

In a discharge flywheel mode to discharge kinetic energy from flywheel 204, variable drive system 202 may cause clutch system 306 to fully engage engine drive clutch 308 and engage (e.g., fully or partially to enable slip) flywheel drive clutch 310. Furthermore, in the discharge flywheel mode, variable drive system 202 may set the engagement radius of first variable pulley 402 to be larger than the engagement radius of second variable pulley 404. Accordingly, the gear ratio of first variable pulley 402 to second variable pulley 404 may be relatively high to absorb or reduce torque output from flywheel 204. In some implementations, the engagement radii, in discharge flywheel mode, may be set according to one or more inputs from drive control system 214, as described herein. In discharge flywheel mode, the gear ratio of variable drive 302 may be variably increased (e.g., increased at a variable rate) to maintain a deceleration (e.g., a constant deceleration) of flywheel 204.

Power system 200 may be placed into flywheel discharge mode to cause flywheel 204 to assist engine 100 in providing FEAD 206, and/or to increase a power output of engine output 104. For example, power transferred from flywheel 204 may enable engine output 104 to provide a power boost (e.g., a combination of power from engine 100 and power from flywheel 204) to machine drive 208 that would not otherwise be possible via engine 100 and/or without flywheel 204 being configured to provide additional power to engine output 104. Additionally, or alternatively, power transferred from flywheel 204 may enable engine 100 reduce a power output to engine output 104 to facilitate a reduction in fuel consumption by engine 100 (e.g., by substituting some power from engine 100 with power from flywheel 204). In some implementations, in the discharge flywheel mode, once flywheel 204 reaches a threshold speed, flywheel drive clutch 310 may be disengaged (e.g., to enable rotation of flywheel 204 to stop).

In a drive FEAD with flywheel mode to enable power transfer from flywheel 204 to FEAD 206 (e.g., when engine 100 is shut down, idling for a threshold period of time, and/or the like), variable drive system 202 may cause clutch system 306 to disengage engine drive clutch 308 and fully engage flywheel drive clutch 310. Furthermore, in the drive FEAD with flywheel mode, variable drive system 202 may set the engagement radius of first variable pulley 402 to be larger than the engagement radius of second variable pulley 404 (e.g., similar to discharge flywheel mode).

In an engine restart mode to restart engine 100 using power from flywheel 204, variable drive system 202 may cause clutch system 306 to engage (e.g., partially to enable slip) engine drive clutch 308 and fully engage flywheel drive clutch 310 (e.g., to enable a maximum amount of power transfer from flywheel 204). The machine may be in engine restart mode when engine 100 is to be restarted within a threshold period of time of being shut down, when engine 100 is to be restarted when flywheel 204 has a threshold amount of kinetic energy (or is rotating at a threshold rotational speed corresponding to amount of power needed to restart engine 100).

In engine restart mode, variable drive system 202 may set the engagement radii of first variable pulley 402 and second variable pulley 404 to be set to be within a threshold range for restarting engine 100. In some implementations, in engine restart mode, the engagement radius of first variable pulley 402 and the engagement radius of second variable pulley 404 may satisfy (e.g., be smaller than or equal to) a threshold engagement radius for restarting engine 100. According to some implementations, the engagement radii of first variable pulley 402 and/or second variable pulley 404 may be a largest possible engagement radius of first variable pulley 402 and/or second variable pulley 404. Additionally, or alternatively, the engagement radii of first variable pulley 402 and second variable pulley 404 may be equal (e.g., within a threshold percentage).

Although FIG. 5 shows example blocks of process 500, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed variable drive system 202 can be integrated into a hybrid power system that includes an engine (e.g., engine 100) and a flywheel (e.g., flywheel 204). Variable drive system 202 enables FEAD 206 to be driven by engine 100 and is capable of bypassing transfer of power to flywheel 204 (e.g., to prevent flywheel 204 from being charged with kinetic energy and/or accelerated). Furthermore, variable drive system 202 enables FEAD 206 to be driven by flywheel 204 and/or enables engine 100 to be bypassed (e.g., for short term continued use of accessories of the machine while the engine is idling and/or shutdown). Moreover, variable drive system 202 enables engine 100 to be restarted from kinetic energy of flywheel 204 via driveshaft 410 of FEAD 206.

Variable drive system 202, as described herein, enables FEAD 206 to operate in a hybrid manner, storing excess energy from engine 100 using flywheel 204 and/or discharging stored kinetic energy from flywheel 204. According to some implementations, variable drive system 202 enables flywheel 204 to be disconnected from FEAD 206 (e.g., after the machine is shut down for a threshold period of time or instructions are received to stop rotation of flywheel 204) to enable FEAD 206 to reach a safe, zero speed state (e.g., without flywheel 204 necessarily reaching a zero speed state).

According to some implementations, variable drive system 202 may be configured as an aftermarket kit to be fit within a variety of different power systems (e.g., power systems of different sizes or component positions). For example, variable drive system 202 may be configured to receive and/or be fit with any number of fixed gear ratio drives (e.g., corresponding to fixed gear ratio drive 304, which may be less expensive and/or easier to manufacture and/or assemble than variable drive 302) that can be interchangeable within variable drive system 202 to fit the variety of different power systems. Furthermore, a pulley of variable drive system 202 may be configured to be mechanically connected to driveshaft 410 of FEAD 206 and a front-end engine output 104 of engine 100, which may be more accessible than an engine output toward a backend of engine 100 (e.g., due to other power system components, such as machine drive 208, other machine components, such as an operator station or passenger cabin of the machine, and/or the like).

Furthermore, because of the relatively drastic potential rotational speed differences between flywheel 204 (e.g., up to approximately 60,000 revolutions per minute RPM) or more) and engine output 104 (e.g., between approximately 600 RPM and 2500 RPM), variable drive system 202 may be mechanically coupled between flywheel 204 and engine output 104 to reduce an amount of slip required for one or more clutches (e.g., engine drive clutch 308 and/or flywheel drive clutch 310) to match speeds of drives (e.g., first variable pulley 402 and/or second variable pulley 404) of variable drive 302 to corresponding speeds of engine output 104 and/or flywheel 204. Because slipping a clutch increases wear and tear on the clutch and reduces the useful life of the clutch, variable drive system 202 may further maintain the health of and/or lengthen the useful life of the clutches of clutch system 306, relative to using a fixed gear ratio transmission or drive between flywheel 204 and engine output 104.

Moreover, variable drive system 202 enables adjustment of a gear ratio through gradual increases and/or gradual decreases in engagement radii of the drives of variable drive 302. Therefore, variable drive system 202 does not have to shift between engaging fixed gears of a transmission and can enable fine rotational speed control of driveshaft 410 to enable a belt speed of FEAD 206 to be relatively stable, regardless of whether driveshaft 410 is powered by engine output 104 or flywheel 204. Furthermore, shifting between fixed gears of a transmission is inefficient relative to variable drive 302 because some power can be lost during the shift between fixed gears (e.g., flywheel 204 slows during shift between fixed gears) and/or power cannot be provided when shifting between fixed gears of the transmission (e.g., when a drive is disengaged there is a disruption in an availability of power of flywheel 204 and/or engine output 104). Accordingly, the gradual increases and decreases to the gear ratio (through corresponding gradual increases and/or decreases of engagement radii) enabled by variable drive 302 and/or set by variable drive system 202, as described herein, may conserve power relative to shifting between fixed gear ratios of a fixed gear ratio transmission.

What is claimed is:

1. A variable drive system to drive an accessory drive of a machine, the variable drive system comprising:
a first variable pulley to be mechanically coupled to the accessory drive and an engine output of an engine;
a second variable pulley to be mechanically coupled to a flywheel; and
a clutch system including:
a first clutch to provide power from the engine to the accessory drive via the engine output; and
a second clutch to at least one of:
provide, from the flywheel, power to the accessory drive via the first variable pulley and the second variable pulley, or
provide power from the engine to the flywheel via the engine output, the first variable pulley, and the second variable pulley.

2. The variable drive system of claim 1, wherein the clutch system is mechanically coupled to the engine output between the engine and the first variable pulley.

3. The variable drive system of claim 1, further comprising a fixed gear ratio drive,
wherein the second variable pulley is mechanically coupled to the flywheel via the fixed gear ratio drive.

4. The variable drive system of claim 3, wherein the clutch system is mechanically coupled between the fixed gear ratio drive and the first variable pulley.

5. The variable drive system of claim 3, wherein the fixed gear ratio drive is positioned between the clutch system and the second variable pulley.

6. The variable drive system of claim 3, wherein the fixed gear ratio drive comprises at least one of:
a set of countershaft gear trains, or
a set of planetary gear trains.

7. The variable drive system of claim 1, wherein the accessory drive is a front end accessory drive.

8. The variable drive system of claim 1, further comprising:
a fixed gear ratio drive; and
a variable drive positioned between the second clutch and the fixed gear ratio drive.

9. A power system to drive an accessory drive of a machine, the power system comprising:
an engine configured to provide power via an engine output;
a flywheel;
a clutch system configured to at least one of:
enable, via a first clutch, a transfer of power from the engine output, or
enable, via a second clutch, a transfer of power associated with the flywheel; and
a variable drive configured to drive the accessory drive using power from at least one of the engine or the flywheel according to a setting of the clutch system; and
a fixed gear ratio drive mechanically coupled to the variable drive to facilitate mechanical coupling of the variable drive to at least one of:
the flywheel, or
the clutch system.

10. The power system of claim 9, wherein the variable drive comprises:
a first variable pulley configured to be mechanically coupled to the accessory drive and coupled to the engine output via the first clutch; and
a second variable pulley configured to be mechanically coupled, via the second clutch, to the flywheel.

11. The power system of claim 10, wherein a gear ratio between a first engagement radius of the first variable pulley and a second engagement radius of the second variable pulley enables the second variable pulley to accelerate or decelerate the flywheel.

12. The power system of claim 9, wherein the setting of the clutch system enables bidirectional power transfer via a driveshaft of the accessory drive.

13. The power system of claim 9, wherein the setting of the clutch system is based on an operating mode of the power system.

14. The power system of claim 9, wherein the fixed gear ratio drive is positioned between the variable drive and the flywheel.

15. A method performed by a variable drive system to transfer power from a power system to an accessory drive of a machine, the method comprising:
   setting, based on an operating mode of the machine, a first engagement radius of a first variable pulley of a variable drive;
   setting, based on the operating mode, a second engagement radius of a second variable pulley of the variable drive; and
   causing, based on the operating mode, a clutch system to engage at least one of:
      an engine drive clutch of an engine of the power system, or
      a flywheel drive clutch of a flywheel of the power system,
         wherein the first variable pulley is configured to couple to an engine output of the engine via the engine drive clutch, and the second variable pulley is configured to couple to the flywheel via the flywheel drive clutch.

16. The method of claim 15,
   wherein, when the operating mode of the machine is associated with launching the flywheel,
      the clutch system is to fully engage the engine drive clutch with the engine output and enable slip of the flywheel drive clutch of the flywheel, and
      the first engagement radius and the second engagement radius are set to be within a threshold range for launching the flywheel.

17. The method of claim 15,
   wherein, when the operating mode of the machine is associated with charging the flywheel,
      the clutch system is to fully engage the engine drive clutch with the engine output and fully engage the flywheel drive clutch of the flywheel, and
      the first engagement radius is set to be smaller than the second engagement radius.

18. The method of claim 15,
   wherein, when the operating mode of the machine is associated with discharging the flywheel,
      the clutch system is to fully engage the engine drive clutch with the engine output, and to at least one of:
         fully engage the flywheel drive clutch, or
         enable slip of the flywheel drive clutch, and
      the first engagement radius is set to be larger than the second engagement radius.

19. The method of claim 15,
   wherein, when the operating mode of the machine is associated with transferring power from the flywheel,
      the clutch system is to disengage the engine drive clutch from the engine output and fully engage the flywheel drive clutch, and
      the first engagement radius is set to be larger than the second engagement radius.

20. The method of claim 15,
   wherein, when the operating mode of the machine is associated with restarting the engine by transferring power from the flywheel,
      the clutch system is to enable the engine drive clutch to slip with the engine output and fully engage the flywheel drive clutch, and
      the first engagement radius and the second engagement radius are set to be within a threshold range for restarting the engine.

\* \* \* \* \*